Aug. 27, 1940. H. T. KRAFT 2,213,028
RUBBER TIRE AND METHOD OF MAKING THE SAME
Filed Aug. 7, 1936 3 Sheets-Sheet 1
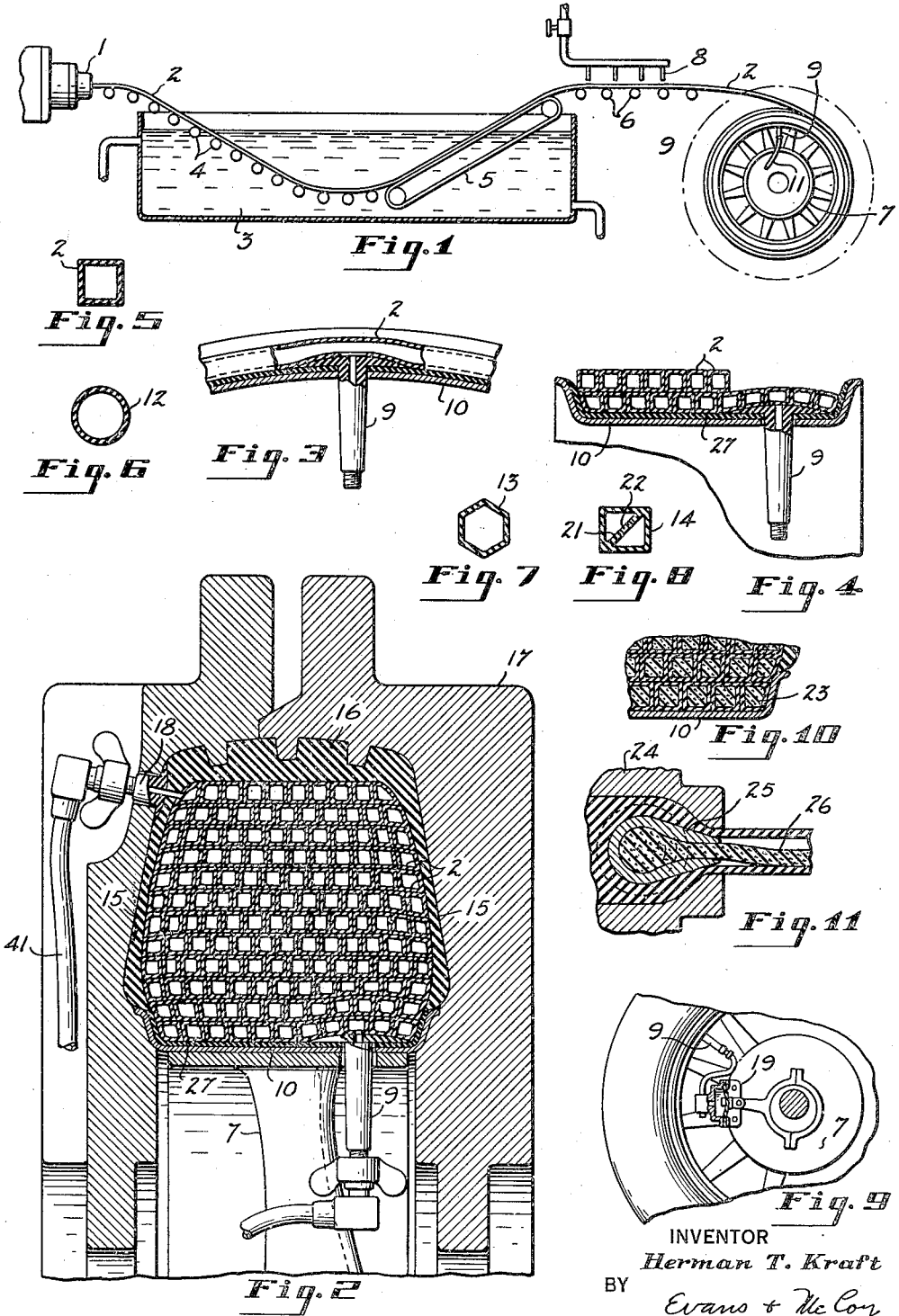
INVENTOR
Herman T. Kraft
BY Evans & McCoy
ATTORNEYS Aug. 27, 1940.   H. T. KRAFT   2,213,028
RUBBER TIRE AND METHOD OF MAKING THE SAME
Filed Aug. 7, 1936   3 Sheets-Sheet 2

INVENTOR
Herman T. Kraft
BY
Evans & McCoy
ATTORNEYS

Aug. 27, 1940.    H. T. KRAFT    2,213,028
RUBBER TIRE AND METHOD OF MAKING THE SAME
Filed Aug. 7, 1936    3 Sheets-Sheet 3

INVENTOR
Herman T. Kraft
BY
Evans & McCoy
ATTORNEYS

Patented Aug. 27, 1940

2,213,028

UNITED STATES PATENT OFFICE 2,213,028

RUBBER TIRE AND METHOD OF MAKING THE SAME

Herman T. Kraft, Akron, Ohio, assignor to The General Tire & Rubber Company, Akron, Ohio, a corporation of Ohio Application August 7, 1936, Serial No. 94,817

17 Claims. (Cl. 154—14)

This invention relates to rubber tires and the method of making the same, and particularly to the production of a pneumatic tire which is operable with or without internal air pressure.

It is the object of the present invention to provide a tire for motor vehicles and airplanes which is so constructed as to be self-sustaining and capable of supporting a considerable load when the internal air pressure is released so that the vehicle or plane cannot be put out of commission by puncture of a tire.

A further object of the invention is to provide a method of making a pneumatic tire which has internal partition walls which serve to prevent collapse of the tire when the internal air pressure is released.

A further object is to provide a tire having an internal air space divided by internal partition walls into parallel circumferential chambers extending side by side and in spiral convolutions from the base of the tread.

A further object of the invention is to provide a tire having a single air cavity which extends in helical convolutions throughout the width of the base and in superimposed convolutions from the base to the tread, the contacting walls of the tube being joined by vulcanization so that internal load-sustaining partition walls are formed.

With the above and other objects in view, the invention may be said to comprise the rubber tire and method of making the same as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification, in which Figure 1 shows a tube-extruding machine, a rotatably mounted wheel and means for conveying tubing as it is formed from the extruding machine and winding upon the rim of the wheel to form a tire;

Fig. 2 is a sectional view showing the built-up tire in a vulcanizing mold;

Fig. 3 is a sectional detail view showing how the end of the tubing is attached to the valve stem on the wheel rim in building the tire;

Fig. 4 is a sectional view showing a rim with tubing wound in superimposed layers thereon;

Figs. 5, 6, 7 and 8 are sections showing tubing of various cross-sectional shapes which may be employed in making the tire;

Fig. 9 is a detail view showing a pump for circulating air through the tire during operation;

Fig. 10 is a fragmentary section showing a modified form of the invention in which the spiral internal cavity of the tire is filled with sponge rubber;

Fig. 11 is a detail view showing how the strip of sponge rubber stock is delivered into the tube in forming the tire.

Figure 12:
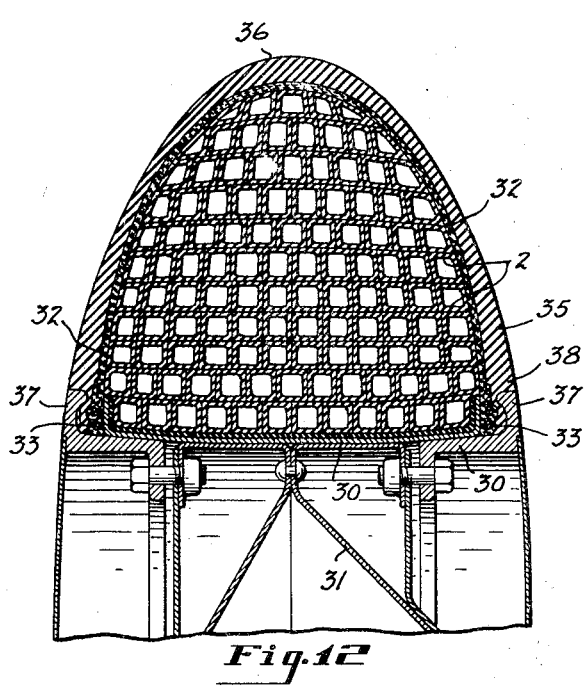
Fig. 12 is a sectional view showing an airplane tire embodying the invention.

The tire of the present invention is cellular in cross-section, having a core which is provided througout its width and depth with closely spaced circumferential passages of small cross section separated by relatively thin circumferentially extending partition walls, the passages being in communication to equalize the air pressure within the tire.

In making the tire according to the method of the present invention, as illustrated in Figs. 1 to 13, a tube of unvulcanized rubber of relatively small cross section is wound in parallel helical convolutions upon a suitable tire-receiving rim which has been treated to establish a strong adhesion between the rubber and metal when the rubber is vulcanized.

The tube is wound in parallel helical convolutions upon the rim and, after the first layer is wound on the rim, additional layers of superimposed helical convolutions are wound thereon until the tubing wound upon the rim is substantially in the form of the completed tire. After completion of the winding operation, suitable side wall and tread stock is applied to the exterior of the core formed by the spirally wound tubing and the tire so formed is vulcanized in a suitable mold. The end of the tube delivered from the extruding machine is first attached to the tire rim by connecting it to a valve stem on the rim so that the tire, after it is built, may be inflated to the desired degree in the mold to cause the tire to assume the shape of the mold cavity. When vulcanized, the tire is permanently attached to the rim and may be inflated through the valve stem. The walls of contiguous convolutions of the tube within the tire are integrally joined by vulcanization, forming a network of partitions within the tire, which will support the tire against collapse when the internal air pressure is relieved and which are capable of sustaining considerable loads so that the vehicle or airplane upon which the tire is used is not put out of commission upon puncture of the tire.

Figure 1 shows a suitable extruding machine provided with a die 1 through which a tube 2 may be extruded. The tube 2 passes from the extruding machine into a cooling bath 3 over a set of rollers 4 and a belt 5 to a second bed of rollers 6 from which it passes to the rim of a wheel 7. Between the wheel 7 and the bath 3 a series of air jet nozzles 8 may be provided for blowing air upon the tube to remove moisture prior to the passage of the tube to the wheel. The wheel is provided with a valve stem 9 and the end of the tube first attached to the wheel rim 10 is sealed as shown in Fig. 3 and attached to the valve stem 9. An air tube 11 may be attached to the valve stem 9 so that a few ounces of air pressure may be maintained within the tube during the winding operation. The tube 2 is preferably rectangular in cross section as shown in Figs. 2, 4 and 5, but if desired, a round tube such as the tube 12 shown in Fig. 6, a hexagonal tube such as tube 13 shown in Fig. 7, or a partitioned tube such as the tube 14 shown in Fig. 8, may be employed. After the tube 2 is attached to the valve stem 9 the wheel 7 is rotated with a peripheral speed corresponding to the rate at which the tube is formed by the extruding machine, the tube being laid on the rim in helical convolutions side by side until the base of the rim is covered, upon the completion of the layer of helical convolutions on the base the angularity of the tube to the wheel axis is changed and a second layer of parallel convolutions is wound upon the first. The winding is continued, layer upon layer, until the core formed by the tube is built up substantially to the form of the tire, whereupon suitable side wall stock 15 is applied to each side of the core and tread stock 16 is applied to the periphery of the core. The wheel 7 with the tire thereon is then placed in a suitable vulcanizing mold 17 such as shown in Fig. 2, the sections of which, when joined together, provide an annular cavity conforming to the shape of the completed tire.

Considerable internal pressure is then applied to the tubing forming the core of the tire which causes the tire to expand and fill the mold.

A suitable outlet fitting 18 is preferably attached to the outer end of the spiral tube 2 and this fitting may be embedded in the side and tread wall stock adjacent the shoulder of the tire. In vulcanizing, fluid pressure-supplying and exhausting connections may be attached to the valve stem 9 and outlet fitting 18 to circulate hot water or steam through the tire during the vulcanizing operation, the water or steam passing throughout the entire length of the tube from inlet 9 to outlet 18.

After vulcanization the outlet 18 may be sealed and the valve stem 9 used for inflating the tire.

The valve stem 9 and outlet 18 may be utilized to maintain an air pressure within the tire to maintain a circulation of cold air through the tire while in use. The outlet 18 may be provided with a suitable valve which permits egress of air above a certain predetermined pressure and the valve stem may be constructed to permit ingress of air at a predetermined pressure. The valve stem 9 may be connected to a low pressure pump 19 on the wheel axle operated by a rotation of the wheel as shown in Fig. 9 and capable of maintaining a desired pressure in the line leading to the valve stem 9. During operation of the wheel, air will be forced out of the tire each time that the valve 18 comes adjacent the ground, due to the increase in air pressure adjacent the valve. Air will be continually supplied through the valve stem 9 to maintain the desired pressure within the tire. In this way cool air will be continuously supplied to the base of the tire and heated air will be discharged from the peripheral portion of the tire.

The tube 14, shown in Fig. 8, is extruded with a continuous diagonal partition 21 which may be provided with an opening 22 adjacent its outer end. The partition forms two separate passageways throughout the length of the tube. By placing these passageways in communication at the outer end, the heating fluid may be caused to travel from the inner end of the tube, attached to the base, to the outer end thereof and back through the other passage to a suitable outlet in the base of the tire.

For certain uses, such as for airplane tail skid wheels, where it is desirable to deaden the rebound of the tire, the spiral internal cavity of the tire may be filled with sponge rubber 23 as shown in Fig. 10. Sponge rubber may be supplied to the interior of the tube by providing the core of a tube extruding die 24 with a central passage 25, through which sponge rubber stock may be fed in the form of a continuous strip 26 into the interior of the tube 2 as it is formed, as shown in Fig. 11. The sponge rubber stock is masticated until it is fairly soft and mixed with the usual vulcanizing agents, fillers and softeners, together with a blowing agent such as sodium bicarbonate, prior to its extrusion. The tire is then built up with a continuous spiral internal cavity having a continuous strip of sponge rubber stock therein. When a tire thus formed is placed in a vulcanizing mold and subjected to heat the blowing agent in the sponge rubber stock liberates a gas causing the strip of sponge rubber stock to expand and fill the tube and create sufficient internal pressure to cause the tire to swell out and fill the mold.

To secure firmer adhesion between the tire and its rim, the rim may be coated with a layer 27 of hard rubber stock, shown in Figs. 2 and 4, prior to winding the rubber tube 2 thereon, the hard rubber stock being secured to the rim by means of a suitable cement.

Figure 14:
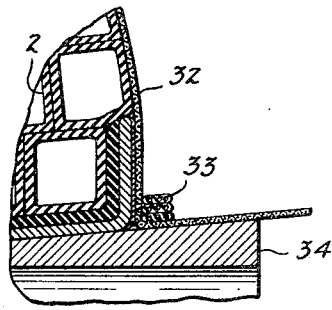
Fig. 14 is a sectional view showing the way in which the tire beads and fabric is applied to the tire.
Figure 15:
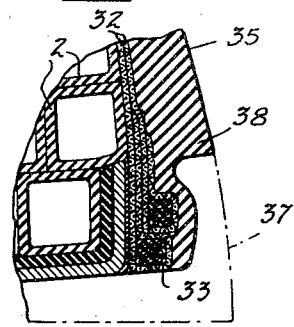
Fig. 15 is a fragmentary sectional view through one bead and bead-retaining flange.
Figure 13:
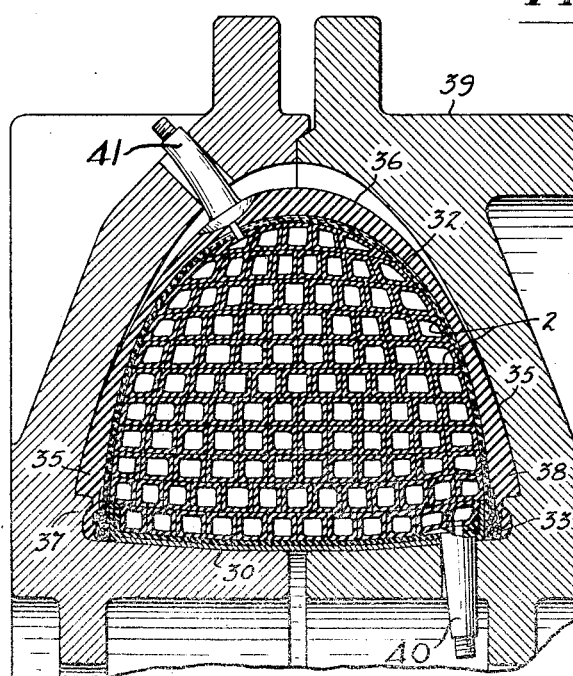
Fig. 13 is a sectional view showing the airplane tire in a vulcanizing mold.

As shown in Figs. 12 and 13 of the drawings, a tire similar to that shown in Fig. 2 may be built upon a rim 30 of an airplane wheel 31 in the manner above described. In order to provide the necessary resistance to side thrust the airplane tire is preferably provided with a suitable number of layers of reinforcing fabric 32, preferably cord fabric with the cords arranged at the proper angle for providing maximum strength and stability. Fabric layers 32 are stitched down upon the built-up body or core of the tire and caused to adhere to the core throughout the exposed surface thereof. During the application of the tire fabric the rim 30 is preferably mounted upon a drum 34, as shown in Fig. 14, which extends laterally beyond each side of the rim forming a ledge upon which a suitable number of wire convolutions may be wound upon the fabric to form a bead 33. After the beads have been applied the side edges of the fabric are doubled back and stitched to the sides of the tire as shown in Fig. 15. Side wall stock 35 and tread stock 36 are then applied. In the completed tire, flanges 37 retain the beads against the exterior flanges of the main rim and securely clamp the beads in place. The side wall stock has a thickened portion 38 adjacent the base containing sufficient rubber stock so that when the tire is molded the external surface of the tire is flush with the exterior surfaces of the bead-retaining flanges 37. A tire, built as above described, may be placed within a suitable mold 39, connected to suitable fluid inlet and outlet tubes 40 and 41 and subjected to sufficient internal pressure to cause the tire to conform to the internal shape of the mold. After vulcanization the rim 30 is mounted on the wheel 31 and the bead-retaining flanges 37 are secured in place.

Figure 16:
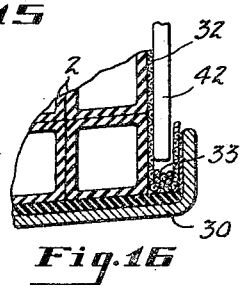
Fig. 16 is a fragmentary view showing another method of applying the beads.
Figure 17:
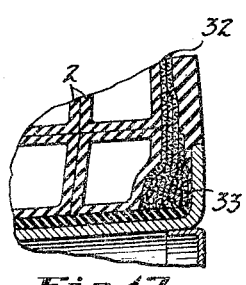
Fig. 17 is a fragmentary section through a bead.

An alternative method of applying the bead rings is illustrated in Fig. 16. According to this method, the cellular core is crowded inwardly away from the flange of the rim 30 and the fabric 32 is forced into the space between the flange and core by means of a flat tool 42 which is forced radially inwardly between the core and flange. The fabric is then drawn down against the bottom of the rim by winding the bead wire 23 in the pocket formed in the fabric by the tool 42, after which the fabric flap is stitched against the side wall.

Figure 18:
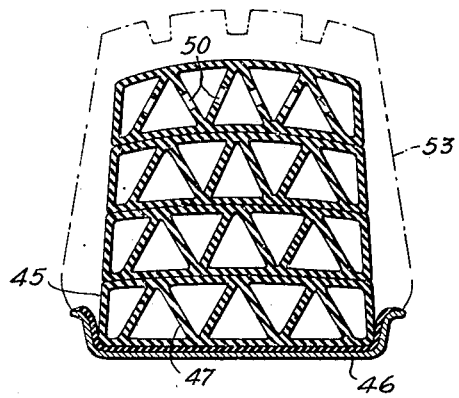
Fig. 18 is a sectional view showing a tire core of modified construction.
Figure 19:
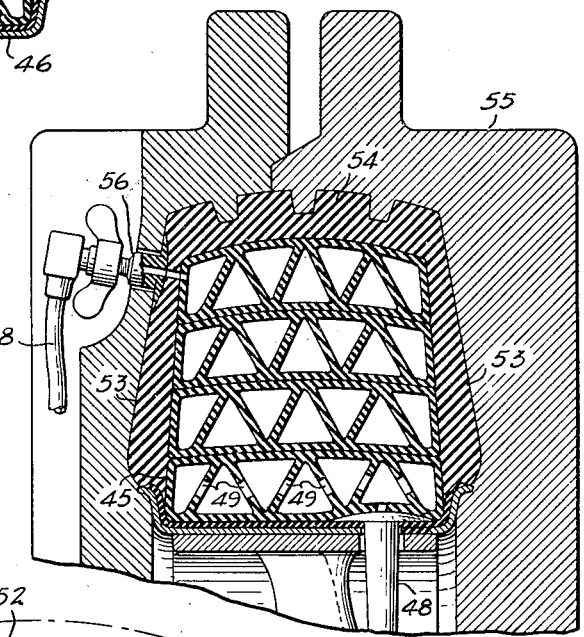
Fig. 19 is a sectional view showing a completed tire in a mold.
Figure 20:
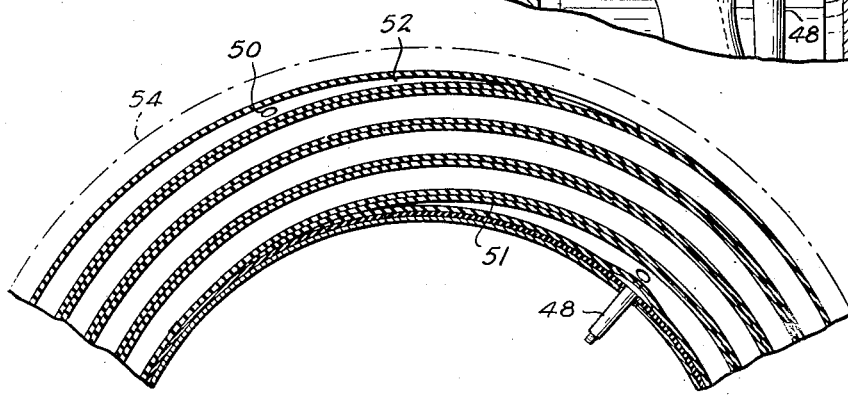
Fig. 20 is a fragmentary central section through the tire showing how the ends of the tube strip are sealed.

The hollow core material may be forced from an extruding machine having a die shaped to deliver the material in the form of a hollow strip 45, the width of which is that of the base of the tire to be formed, and this strip may be wound upon a rim 46 to provide a tire core such as shown in Fig. 18.

The hollow strip 45 is divided into a series of parallel passageways by continuous longitudinal laterally inclined partitions 47. The top wall of the strip is arched slightly to provide a depth at the center somewhat greater than at the side edges, so that as successive convolutions of the strip are laid the transverse curvature of the crown is increased and the core, when built up to the desired size, conforms substantially to the shape of the completed tire.

Adjacent the end thereof, attached to the base, the strip 45 has a suitable valve stem 48 attached thereto and the partitions 47 adjacent the stem are provided with apertures 49, so that all of the longitudinal passages in the strip 45 are in communication.

At the inner end of the strip, adjacent the outer end of the strip, the partitions 47 have apertures 50, placing all of the passages in communication.

The apertures 49 may be formed by forcing a suitable tool with a heated point up through the bottom wall of the strip and then laterally through the partition walls 47, first upon one side and then the other of the valve stem opening.

The apertures 50 may be formed by forcing a tool with a heated point laterally through the wall at one edge of the strip and through the partition walls 47.

The ends of the strip 45 are sealed by squeezing the top wall down upon the bottom wall of the strip to provide tapering ends 51 and 52, which are closed by the union of the top and bottom walls.

After the core is formed as above described, suitable side wall stock 53 and tread stock 54 is applied and the tire is placed in a suitable mold 55. An outlet fitting 56 may be secured in the side wall opening adjacent the tread and steam or hot water may be circulated through the core for vulcanization through stem 48 and tube 59 attached to fitting 56.

As herein shown the passages in the central portion of the core are of greater cross-sectional area than those along the sides of the core which are adjacent the walls of the mold. The heating fluid will, therefore, have more rapid circulation in the central portion of the core which makes for more uniform vulcanization.

The tubing employed in building the tire may be relatively thin-walled, so that the internal partitions within the tire are thin and the weight of the tire is not greatly in excess of an ordinary pneumatic tire.

The advantage of a tire capable of functioning even though punctured, so that it is not necessary to stop for repairs due to puncture, is quite obvious. However, the tire of the present invention is of more vital importance in warfare, since it is obviously highly important that a motor vehicle be capable of proceeding, even though its tires be perforated with bullets. This is true even to a greater extent with airplanes, since it is necessary to provide airplanes with relatively large tires on the landing wheels in order to provide the necessary cushioning action for landing, and these tires are a very vulnerable part of the airplane. With an ordinary pneumatic tire a bullet puncture is almost sure to cause serious damage to the plane in landing. The present invention provides a tire upon which a plane may be safely landed, even though the tires be perforated by bullets.

It will be understood that numerous modifications of the construction shown may be resorted to without departing from the spirit of this invention, as defined in the appended claims.

What I claim is:

1. An integral one-piece rubber tire having a core of cellular form in transverse cross section divided by circumferentially extending partition walls into superposed rows of circumferential passages, all of said passages being in communication for equalization of air pressure throughout the core, said passages being interconnected for flow of fluid spirally through the core, said core being provided with a fluid inlet to the base portion thereof.

2. An integral one-piece rubber tire having an internal cavity of relatively small cross sectional area winding spirally from the base portion to the tread portion of the tire, the rubber of the tire forming integrally connected partition walls between adjacent convolutions of the cavity, and means for admitting air under pressure to said cavity.

3. An intergral one-piece rubber tire having a core of cellular form in transverse cross section, said core having a series of circumferential passages extending side by side throughout the width of its base and similar superposed circumferential passages throughout its width from the base to the tread portion thereof, said passages being separated by relatively thin integrally connected partition walls, and fabric reinforcement covering said core outwardly of the base.

4. An integral one-piece rubber tire having an internal cavity of relatively small cross-sectional area winding through the tire in parallel helical coils superimposed upon parallel helical coils from the base portion to the tread portion of the tire, the rubber of the tire forming integrally connected partition walls between adjacent convolutions of the cavity.

5. An integral one-piece rubber tire having an internal cavity of relatively small cross-sectional area winding through the tire in helical coils superimposed upon helical coils from the base portion to the tread portion of the tire, the rubber of the tire forming integrally connected partition walls between adjacent convolutions of the cavity and means for admitting air under pressure into said cavity.

6. An integral one-piece rubber tire having a single internal cavity of relatively small cross-sectional area having walls substantially flat in cross-section, one end of said cavity being disposed adjacent the base portion and the other adjacent the tread portion of the tire, said cavity winding through the tire in helical coils superimposed upon helical coils, laterally and radially adjacent coils throughout the interior of the tire being separated by relatively thin integrally connected walls of rubber.

7. An integral one-piece rubber tire having a single internal cavity of relatively small cross-sectional area, one end of said cavity being disposed adjacent the base portion and the other adjacent the tread portion of the tire, said cavity winding through the tire in helical coils superimposed upon helical coils, laterally and radially adjacent coils throughout the interior of the tire being separated by relatively thin integrally connected walls of rubber, and means for admitting air under pressure to said cavity.

8. An integral one-piece rubber tire having a single internal cavity of relatively small cross-sectional area and substantially triangular in cross section, one end of said cavity being disposed adjacent the base portion and the other adjacent the tread portion of the tire, said cavity winding through the tire in helical coils superimposed upon helical coils, laterally and radially adjacent coils throughout the interior of the tire being separated by relatively thin integrally connected walls of rubber.

9. An integral one-piece rubber tire having a single internal cavity of relatively small cross-sectional area, one end of said cavity being disposed adjacent the base portion and the other adjacent the tread portion of the tire, said cavity having walls substantially flat in cross-section winding through the tire in helical coils superimposed upon helical coils, laterally and radially adjacent coils throughout the interior of the tire being separated by relatively thin integrally connected walls of rubber, and means for maintaining a circulation of air through said cavity.

10. An integral one-piece rubber tire having an internal cavity of relatively small cross-sectional area winding through the tire in helical coils superimposed upon helical coils from the base portion to the tread portion of the tire, the rubber of the tire forming integrally connected partition walls between adjacent convolutions of the cavity and fabric reinforcement between the cavity and exterior surface of the tire outwardly of the base.

11. An integral one-piece rubber tire having a single internal cavity of relatively small cross-sectional area and substantially rectangular in cross section, one end of said cavity being disposed adjacent the base portion and the other adjacent the tread portion of the tire, said cavity winding through the tire in helical coils superimposed upon helical coils, laterally and radially adjacent coils throughout the interior of the tire being separated by relatively thin integrally connected walls of rubber, and fabric reinforcement between the cavity and exterior surface of the tire outwardly of the base.

12. The combination with a tire base, of an integral one-piece rubber tire vulcanized to the base and having an internal cavity of relatively small cross-sectional area winding through the tire in parallel helical coils superimposed upon parallel helical coils from the base portion to the tread portion of the tire, the rubber of the tire forming integrally connected partition walls between adjacent convolutions of the cavity.

13. The combination with a tire base, of an integral one-piece rubber tire vulcanized to the base and having a single internal cavity of relatively small cross-sectional area, one end of said cavity being disposed adjacent the base portion and the other adjacent the tread portion of the tire, said cavity having flat sides winding through the tire in helical coils superimposed upon helical coils, laterally and radially adjacent coils through the interior of the tire being separated by relatively thin integrally connected walls of rubber.

14. The herein described method of making a rubber tire, which comprises forming a tube of uncured rubber, forming a tire core by winding said tube in superimposed convolutions on a suitable tire base, applying side wall and tread stock to the core to complete the tire, placing the tire carried by the base in a tire mold causing the tire to conform to the interior of the mold by supplying fluid under pressure to the interior of the tubing forming the core, and applying heat to the tire in the mold to vulcanize the tire.

15. The herein described method of making a rubber tire, which comprises forming a tube of uncured rubber, forming a tire core by winding said tube in superimposed convolutions on a suitable tire base, applying side wall and tread stock to the core to complete the tire, placing the tire carried by the base in a tire mold causing the tire to conform to the interior of the mold by supplying fluid under pressure to the interior of the tubing forming the core, and circulating a heated fluid through the tube forming the core of the tire to vulcanize the same.

16. The herein described method of making a rubber tire, which comprises extruding a tube of uncured rubber, winding the tube as it is extruded in superimposed convolutions upon a suitable tire base while supplying air under a pressure slightly above atmospheric to the interior of the tube to build up a tire core upon the base, severing the tube and sealing the outer end thereof when the winding operation is completed, applying side wall and tread stock to the core to complete the tire, placing the tire carried by the tire base in a mold, causing the tire to conform to the interior of the mold by internal fluid pressure, and applying heat to the tire in the mold to vulcanize the tire.

17. The herein described method of making a rubber tire, which comprises forming a tube of uncured rubber, forming a tire core by winding the tube in superimposed convolutions upon a tire base, covering the core with reinforcing fabric, applying bead rings to the base of the tire and anchoring the fabric to said rings, applying an exterior covering of rubber, placing the tire carried by the base in a tire mold, admitting fluid under pressure to the tube forming the tire core to expand the tire within the mold, and applying heat to the tire in the mold to vulcanize the same.

HERMAN T. KRAFT.